United States Patent
Gururaja

(10) Patent No.: US 12,131,480 B2
(45) Date of Patent: Oct. 29, 2024

(54) METHOD OF CREATING AN OPTIMIZED/ADAPTIVE ROI BASED ON DETECTION OF BARCODE LOCATION IN THE FOV

(71) Applicant: ZEBRA TECHNOLOGIES CORPORATION, Lincolnshire, IL (US)

(72) Inventor: Abhilash Gururaja, Levittown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 335 days.

(21) Appl. No.: 17/488,909

(22) Filed: Sep. 29, 2021

(65) Prior Publication Data
US 2023/0102634 A1     Mar. 30, 2023

(51) Int. Cl.
*G06K 9/62*   (2022.01)
*G06K 7/14*   (2006.01)
*G06T 7/11*   (2017.01)
*G06T 7/174*  (2017.01)

(52) U.S. Cl.
CPC .............. *G06T 7/11* (2017.01); *G06K 7/1417* (2013.01); *G06T 7/174* (2017.01)

(58) Field of Classification Search
CPC .. G06K 7/1413; G06K 7/1417; G06K 7/1443; G06T 7/10–7/194; G06T 7/70–7/77; G06V 30/148–30/158
See application file for complete search history.

(56) References Cited

U.S. PATENT DOCUMENTS

| | | | | |
|---|---|---|---|---|
| 5,974,192 | A | * | 10/1999 | Kundu ............... G06T 7/231 382/254 |
| 2005/0103846 | A1 | | 5/2005 | Zhu et al. |
| 2010/0177363 | A1 | | 7/2010 | Zhou |
| 2016/0104021 | A1 | * | 4/2016 | Negro ............... G06K 7/1417 235/462.08 |
| 2020/0074131 | A1 | | 3/2020 | Negro et al. |
| 2022/0383483 | A1 | * | 12/2022 | Moore ............... G06T 7/11 |

OTHER PUBLICATIONS

Search and Examination Report for Great Britain Application No. 2213807 mailed on Mar. 13, 2023.
IdentWERK: Processes." Capture VDA4902 label with one scan!" Website dated Oct. 21, 2021, retrieved from URL: https://web.archive.org/web/20211021145235/https://www.identwerk.de/prozesse/vda4902-label-mit-einem-scan-erfassen (retrieved on Jun. 8, 2023).
Office Action for German patent Application No. 102022124537.3 mailed on Apr. 27, 2023.

\* cited by examiner

*Primary Examiner* — Brian Werner
(74) *Attorney, Agent, or Firm* — Yuri Astvatsaturov

(57) ABSTRACT

Machine vision techniques for determining a region of interest (ROI) are disclosed herein. An example implementation includes a computing device for executing an application, the application operable to: (1) receive a first image; (2) set an first ROI of the first image to a field of view (FOV) of the first image; (3) determine a barcode within the first ROI; (4) determine a bounding box of the barcode; (5) form a second ROI based on the bounding box; (6) receive a second image; and (7) set an ROI of the second image to be the second ROI of the first image.

9 Claims, 10 Drawing Sheets

METHOD OF CREATING AN OPTIMIZED/ADAPTIVE ROI BASED ON DETECTION OF BARCODE LOCATION IN THE FOV

BACKGROUND

It is often useful to locate a barcode on an object. Current machine vision systems accomplish this by first capturing an image of an object, and then searching a field of view (FOV) of the image (e.g., searching the entire image for the barcode or other object). However, searching the entire image is inefficient. Thus, there is a need for improved efficiency in these types of machine vision systems.

SUMMARY

In an embodiment, the present invention is a method for operating a machine vision system, the machine vision system including a computing device for executing an application and a fixed imaging device communicatively coupled to the computing device. The method may comprise: (a) capturing, via the fixed imaging device, a first image over a field of view (FOV); (b) analyzing, via the application, at least a portion of the first image to detect a first barcode within the first image; (c) determining a location of the first barcode within the first image; (d) capturing, via the fixed imaging device, a second image; (e) analyzing, via the application, a region of interest (ROI) of the second image to detect a second barcode, the ROI of the second image being a portion of the second image that is based on the location of the first barcode within the first image; and (f) responsive to detecting the second barcode, transmitting data associated with the second barcode upstream.

In a variation of this embodiment, the second image is captured over the FOV.

In a further variation of this embodiment, the computing device and the fixed imaging device are housed within an enclosure fixedly attached to a structure.

In a further variation of this embodiment, the analyzing the at least a portion of the first image to detect the first barcode within the first image includes analyzing a portion of the first image to detect the first barcode within the first image.

In a further variation of this embodiment, responsive to not detecting the second barcode within the ROI of the second image, the method further includes: capturing, via the fixed imaging device, a third image; analyzing, via the application, an ROI of the third image to detect a third barcode; and responsive to detecting the third barcode, transmitting data associated with the third barcode upstream, wherein the ROI of the third image occupies at least a portion of the third image and is larger than the ROI of the second image.

In a further variation of this embodiment, steps (a)-(c) are performed during a first iteration of a machine vision job, and wherein steps (d)-(f) are performed during a second iteration of a machine vision job.

In a further variation of this embodiment, the method further comprises determining, via the application, a bounding box of the first barcode; wherein the ROI of the second image is formed based on the bounding box of the first barcode.

In a further variation of this embodiment, the method further comprises: determining, via the application, a bounding box of the first barcode including determining (i) a lowest x-coordinate of the bounding box, (ii) a highest x-coordinate of the bounding box, (iii) a lowest y-coordinate of the bounding box, and (iv) a highest y-coordinate of the bounding box; wherein the ROI of the second image is formed by setting: (i) a lowest x-coordinate of the ROI of the second image based on the lowest x-coordinate of the bounding box, (ii) a highest x-coordinate of the ROI of the second image based on the highest x-coordinate of the bounding box, (iii) a lowest y-coordinate of the ROI of the second image based on the lowest y-coordinate of the bounding box, and (iv) a highest y-coordinate of the ROI of the second image based on the highest y-coordinate of the bounding box.

In a further variation of this embodiment, the method further comprises: determining, via the application: (i) a horizontal length of the bounding box, and (ii) a vertical length of the bounding box; and wherein: the lowest x-coordinate of the ROI of the second image is determined further based on a first predetermined percentage of the horizontal length; the highest x-coordinate of the ROI of the second image is determined further based on a second predetermined percentage of the horizontal length; the lowest y-coordinate of the ROI of the second image is determined further based on a first predetermined percentage of the vertical length; and the highest y-coordinate of the ROI of the second image is determined further based on a second predetermined percentage of the vertical length.

In another embodiment, the invention is a method for operating a machine vision system, the machine vision system including a computing device for executing an application and a fixed imaging device communicatively coupled to the computing device. The method may comprise: (a) capturing, via the fixed imaging device, a first image over a field of view (FOV); (b) analyzing, via the application, at least a portion of the first image to detect a first barcode within the first image; (c) determining a location of the first barcode within the first image; (d) capturing, via the fixed imaging device, a second image; (e) analyzing, via the application, at least a portion of the second image to detect a second barcode within the second image; (f) determining a location of the second barcode within the second image; (g) capturing, via the fixed imaging device, a third image; (h) analyzing, via the application, a region of interest (ROI) of the third image to detect a third barcode, the ROI of the third image being a portion of the third image that is based on the location of the first barcode within the first image and the location of the second barcode within the second image; and (i) responsive to detecting the third barcode, transmitting data associated with the third barcode upstream.

In a variation of this embodiment, the method further comprises: determining, via the application, a bounding box of the first barcode including determining (i) a lowest x-coordinate of the bounding box, (ii) a highest x-coordinate of the bounding box, (iii) a lowest y-coordinate of the bounding box, and (iv) a highest y-coordinate of the bounding box; wherein the ROI of the third image is formed by setting: (i) a lowest x-coordinate of the ROI of the third image based on the lowest x-coordinate of the bounding box, (ii) a highest x-coordinate of the ROI of the third image based on the highest x-coordinate of the bounding box, (iii) a lowest y-coordinate of the ROI of the third image based on the lowest y-coordinate of the bounding box, and (iv) a highest y-coordinate of the ROI of the third image based on the highest y-coordinate of the bounding box.

In a further variation of this embodiment, the method further comprises: determining, via the application: (i) a horizontal length of the bounding box, and (ii) a vertical length of the bounding box; and wherein: the lowest x-coordinate of the ROI of the third image is determined further based on a first predetermined percentage of the horizontal length; the highest x-coordinate of the ROI of the third image is determined further based on a second predetermined percentage of the horizontal length; the lowest y-coordinate of the ROI of the third image is determined further based on a first predetermined percentage of the vertical length; and the highest y-coordinate of the ROI of the third image is determined further based on a second predetermined percentage of the vertical length.

In yet another embodiment, the invention is a method for operating a machine vision system, the machine vision system including a computing device for executing an application and a fixed imaging device communicatively coupled to the computing device. The method may comprise: (a) capturing, via the fixed imaging device, a first image over a field of view (FOV); (b) analyzing, via the application, at least a portion of the first image to detect a first barcode within the first image; (c) determining a location of the first barcode within the first image; (d) determining a region of interest (ROI) of the first image based on the location of the first barcode within the first image; (e) capturing, via the fixed imaging device, a second image; (f) analyzing, via the application, at least a portion of the second image to detect a second barcode within the second image; (g) determining a location of the second barcode within the second image; (h) determining a ROI of the second image based on the location of the second barcode within the second image; (i) capturing, via the fixed imaging device, a third image; (j) responsive to the ROI of the first image and the ROI of the second image being within a predetermined tolerance, forming an ROI of the third image based on the ROI of the first image and the ROI of the second image; (k) analyzing, via the application, the ROI of the third image to detect a third barcode; and (l) responsive to detecting the third barcode, transmitting data associated with the third barcode upstream.

In a variation of this embodiment, the predetermined tolerance comprises a pixel distance measured by pixel values and/or pixel coordinates.

In a further variation of this embodiment, the method may further comprise, further responsive to the ROI of the first image and the ROI of the second image being within the predetermined tolerance, the ROI of the third image is formed based on an average of the ROI of the first image and the ROI of the second image.

In a further variation of this embodiment, the average is computed by averaging: (i) a lowest x-coordinate of the ROI of the first image with a lowest x-coordinate of the ROI of the second image, (ii) a highest x-coordinate of the ROI of the first image with a highest x-coordinate of the ROI of the second image, (iii) a lowest y-coordinate of the ROI of the first image with a lowest y-coordinate of the ROI of the second image, (iv) a highest y-coordinate of the ROI of the first image with a highest y-coordinate of the ROI of the second image.

In a further variation of this embodiment, the method may further comprise: determining, via the application, a bounding box of the first barcode including determining (i) a lowest x-coordinate of the bounding box, (ii) a highest x-coordinate of the bounding box, (iii) a lowest y-coordinate of the bounding box, and (iv) a highest y-coordinate of the bounding box; wherein the ROI of the third image is formed by setting: (i) a lowest x-coordinate of the ROI of the third image based on the lowest x-coordinate of the bounding box, (ii) a highest x-coordinate of the ROI of the third image based on the highest x-coordinate of the bounding box, (iii) a lowest y-coordinate of the ROI of the third image based on the lowest y-coordinate of the bounding box, and (iv) a highest y-coordinate of the ROI of the third image based on the highest y-coordinate of the bounding box.

In a further variation of this embodiment, the method may further comprise: determining, via the application: (i) a horizontal length of the bounding box, and (ii) a vertical length of the bounding box; and wherein: the lowest x-coordinate of the ROI of the third image is determined further based on a first predetermined percentage of the horizontal length; the highest x-coordinate of the ROI of the third image is determined further based on a second predetermined percentage of the horizontal length; the lowest y-coordinate of the ROI of the third image is determined further based on a first predetermined percentage of the vertical length; and the highest y-coordinate of the ROI of the third image is determined further based on a second predetermined percentage of the vertical length.

In a further variation of this embodiment, the method may further comprise, responsive to the ROI of the first image and the ROI of the second image not being within a predetermined tolerance, forming the ROI of the third image such that the ROI of the third image is larger than either of the ROI of the first image or the ROI of the second image.

In yet another embodiment, the present invention is a method for operating a machine vision system, the machine vision system including a computing device for executing an application and a fixed imaging device communicatively coupled to the computing device. The method may comprise: capturing, via the fixed imaging device, a first image over a field of view (FOV); analyzing, via the application, at least a portion of the first image to detect one or more first barcode within the first image; determining a location of the one or more first barcode within the first image; capturing, via the fixed imaging device, a second image; analyzing, via the application, a region of interest (ROI) of the second image to detect one or more second barcode, the ROI of the second image being a portion of the second image that is based on the location of the one or more first barcode within the first image; and responsive to detecting the one or more second barcode, transmitting data associated with the one or more second barcode upstream.

In a further variation of this embodiment, the method may further comprise: determining, via the application, a bounding box for each barcode of the first at least one barcode including determining (i) a lowest x-coordinate of the bounding boxes, (ii) a highest x-coordinate of the bounding boxes, (iii) a lowest y-coordinate of the bounding boxes, and (iv) a highest y-coordinate of the bounding boxes; wherein the ROI of the second image is formed by setting: (i) a lowest x-coordinate of the ROI of the second image based on the lowest x-coordinate of the bounding boxes, (ii) a highest x-coordinate of the ROI of the second image based on the highest x-coordinate of the bounding boxes, (iii) a lowest y-coordinate of the ROI of the second image based on the lowest y-coordinate of the bounding boxes, and (iv) a highest y-coordinate of the ROI of the second image based on the highest y-coordinate of the bounding boxes.

In a further variation of this embodiment, the method may further comprise: determining, via the application: (i) a horizontal length of the bounding box, and (ii) a vertical length of the bounding boxes; and wherein: the lowest x-coordinate of the ROI of the second image is determined further based on a first predetermined percentage of the horizontal length; the highest x-coordinate of the ROI of the second image is determined further based on a second predetermined percentage of the horizontal length; the lowest y-coordinate of the ROI of the second image is determined further based on a first predetermined percentage of the vertical length; and the highest y-coordinate of the ROI of the second image is determined further based on a second predetermined percentage of the vertical length.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
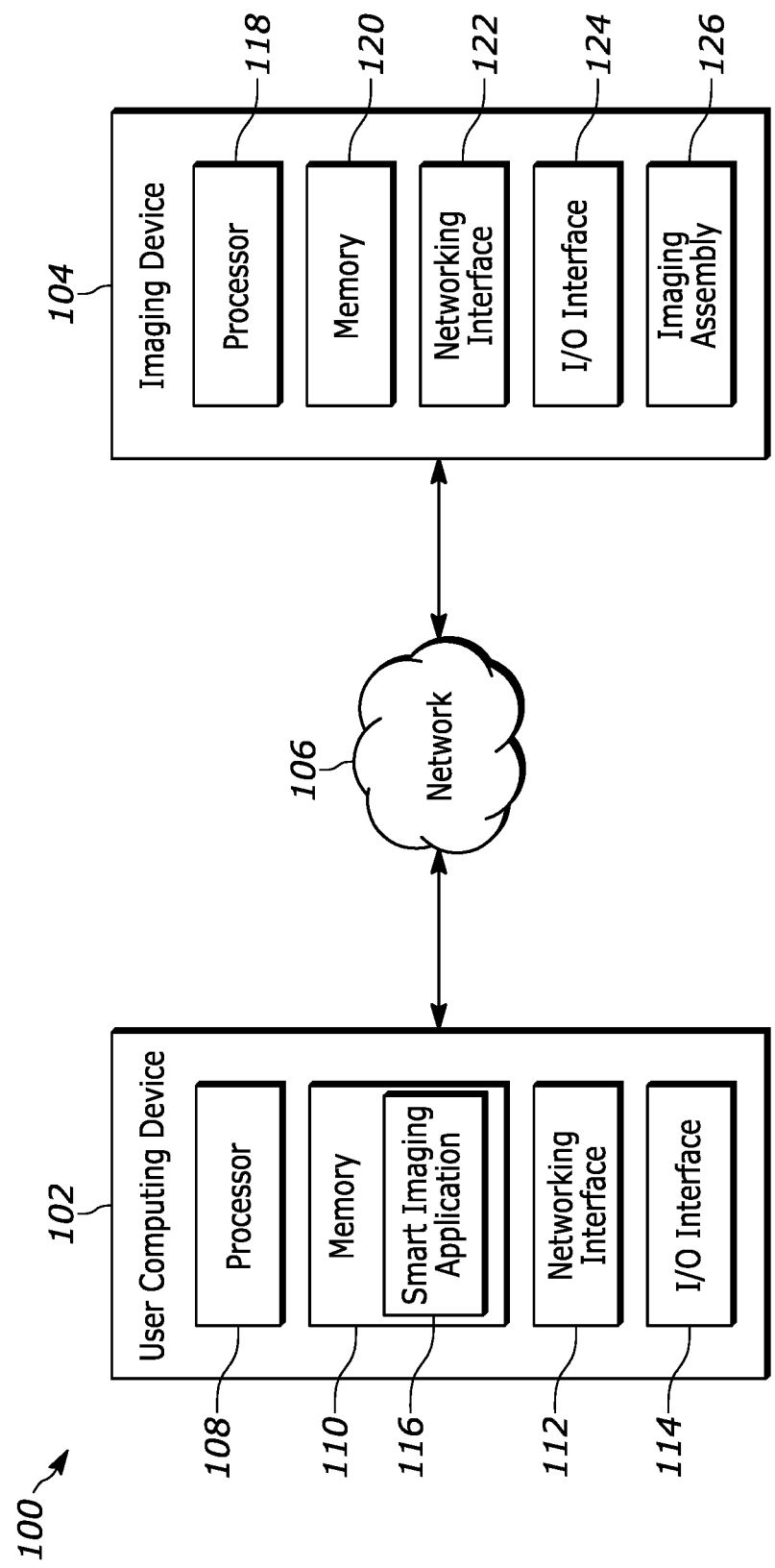
FIG. 1 is an example system for optimizing one or more imaging settings for a machine vision job, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates an example imaging system 100 configured to locate a barcode or other object. In the example embodiment of FIG. 1, the imaging system 100 includes a user computing device 102 and an imaging device 104 communicatively coupled to the user computing device 102 via a network 106. Generally speaking, the user computing device 102 is configured to enable a user/operator to create a machine vision job for execution on the imaging device 104. Once created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output interface 114, and a imaging application 116.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, and input/output interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task, as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

The entire area that the imaging device 104 is able to image may be referred to as the field of view (FOV). In this regard, the FOV is determined by the optics of the imaging device 104. Typically, the imaging device 104 may capture images of the environment appearing within the FOV. When analyzing the image, certain parts of the image may be identified with respect to pixel values, and/or certain coordinates of the image (e.g., horizontal and vertical pixel values, a Cartesian coordinate system including pixel values, etc.).

As mentioned above, the pixel data may be analyzed by one or more tools each configured to perform an image analysis task. For example, a barcode scanning/reading tool may be executed to detect or read a barcode. To this end, it may be useful to define a region of interest (ROI) corresponding to a specific region or a target object imaged by the imaging assembly 126 within which to execute the tool (e.g., to execute the barcode scanning/reading tool). In this regard, and as will become apparent from the following discussion, determining an ROI may be done as part of execution of a tool (e.g., execution of the barcode scanning/reading tool). Additionally or alternatively, determining a ROI may be done specifically with a ROI specification/determination tool.

To further explain the job and the corresponding tools of the job, generally, the imaging application 116 may present a user with a series of menus to create a new job or edit a current job. In creating a new job, the user is able to select from a variety of tools which form a particular job. Such tools may include, but are not limited to, (i) a barcode scanning/reading tool, (ii) a pattern matching tool, (iii) an edge detection tool, (iv) a semantic segmentation tool, (v) an object detection tool, (vi) an object tracking tool, (vii) a region of interest specification/determination tool, etc. For example, if a first type of product is running down an assembly line, a user may configure a first job, including selecting and configuring particular tools, to run (e.g., continuously or iteratively capturing images) while the first type of product is running through the assembly line. Subsequently, when the assembly line switches to a second type of product, the user may end the first job and start a second job by configuring the second job, including selecting and configuring different tools that are more helpful to analyze the second type of product.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the imaging application 116, which may be configured to enable machine vision job construction, as described further herein. Additionally, or alternatively, the imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 and the imaging device 104 via wireless communications based on any one or more of various wireless standards, including by non-limiting example, IEEE 802.11a/b/c/g (WIFI), the BLUETOOTH standard, or the like.

The input/output interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The input/output interfaces 114, 124 may also include input/output components (e.g., ports, capacitive or resistive touch sensitive input panels, keys, buttons, lights, LEDs), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
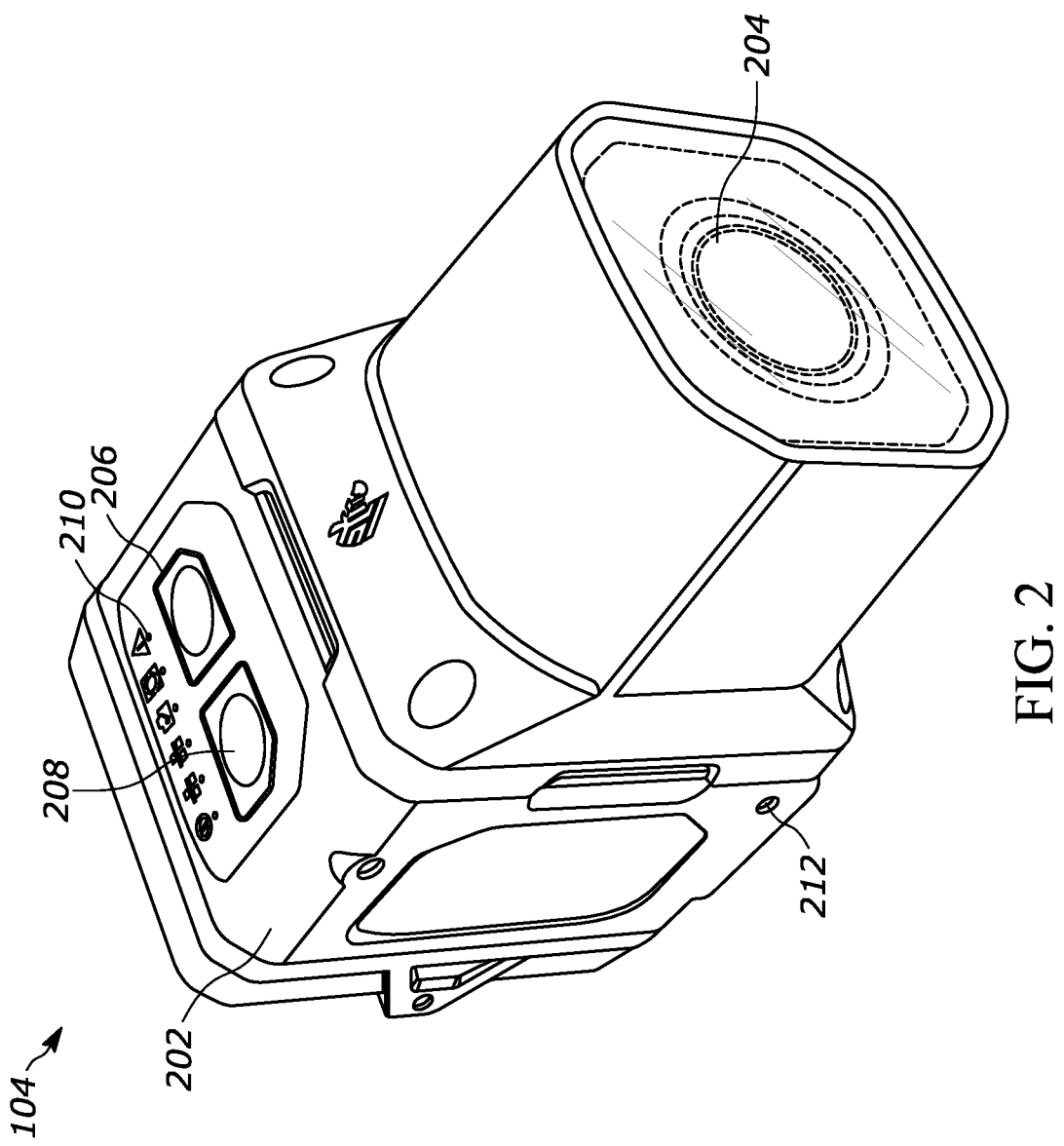
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the imaging application 116, 156) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

One application of the above described technologies is to identify one or more barcodes within an image. Current techniques for identifying barcode(s) in images include searching an entire field of view (FOV) of an image. However, this is inefficient because the barcode(s) may be located in only one portion of the image. Thus, some embodiments set an ROI to be only part of the FOV, and search only the ROI.

It should be understood that the term "image" as used herein may refer to a single image, or to an image of a video frame. Thus, the techniques described herein apply equally to single images and video.

FIGS. 3-6 depict example application interfaces in accordance with embodiments described herein. These example application interfaces 300, 400, 500, 600 may represent interfaces of a imaging application (e.g., imaging application 116) a user may access via a user computing device (e.g., user computing device 102).

Figure 3:
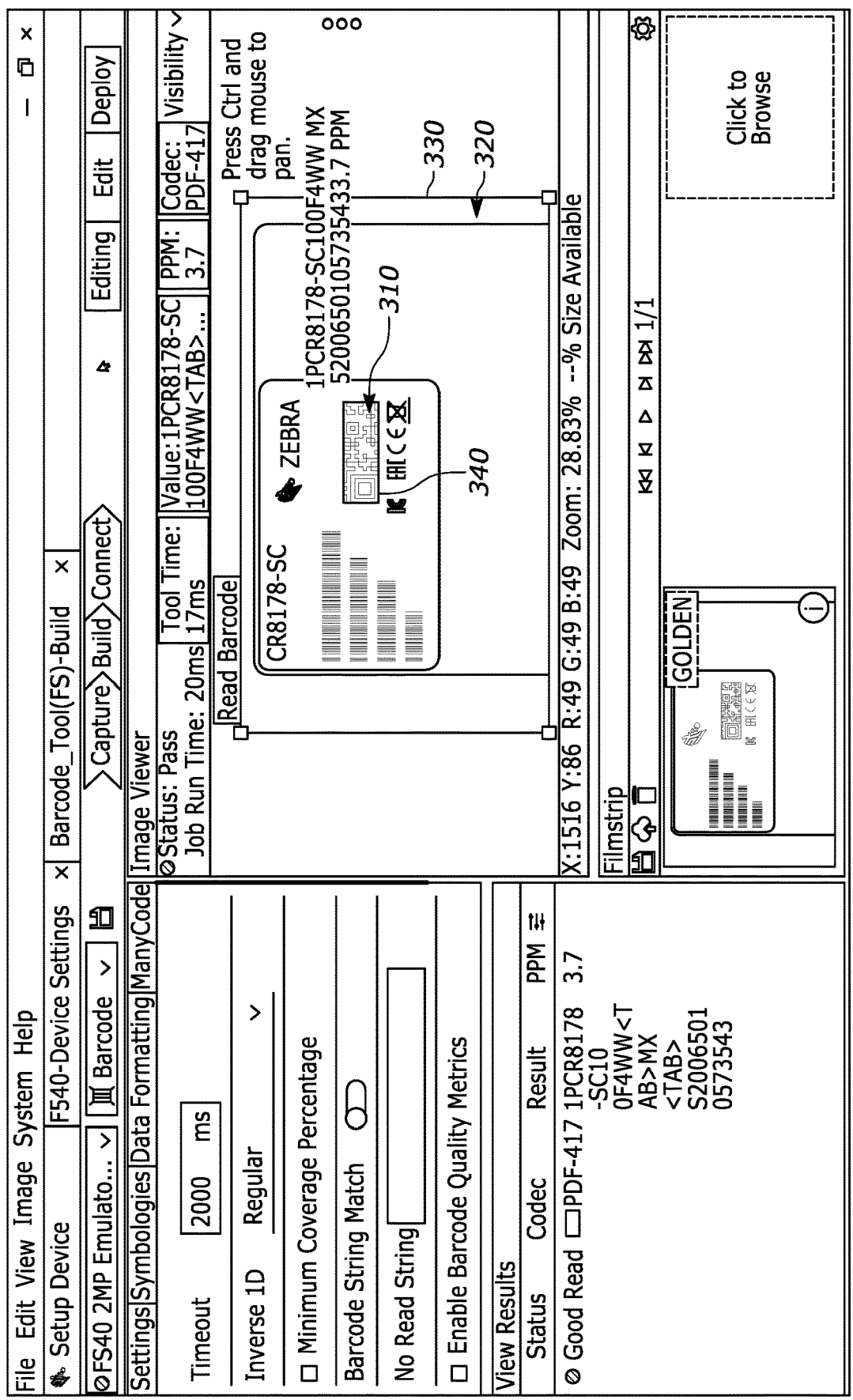
FIG. 3 depicts an example application interface including identification of a single barcode, and where the region of interest (ROI) is the field of view (FOV).

In FIG. 3, the example application interface 300 depicts identification of a single barcode 310, and where the region of interest (ROI) 330 is the field of view (FOV) 320 (e.g., the entire image). In this regard, in some embodiments, the default ROI is the FOV. Further in this example, the imaging application 116 has determined a bounding box 340 of the barcode 310.

Figure 4:
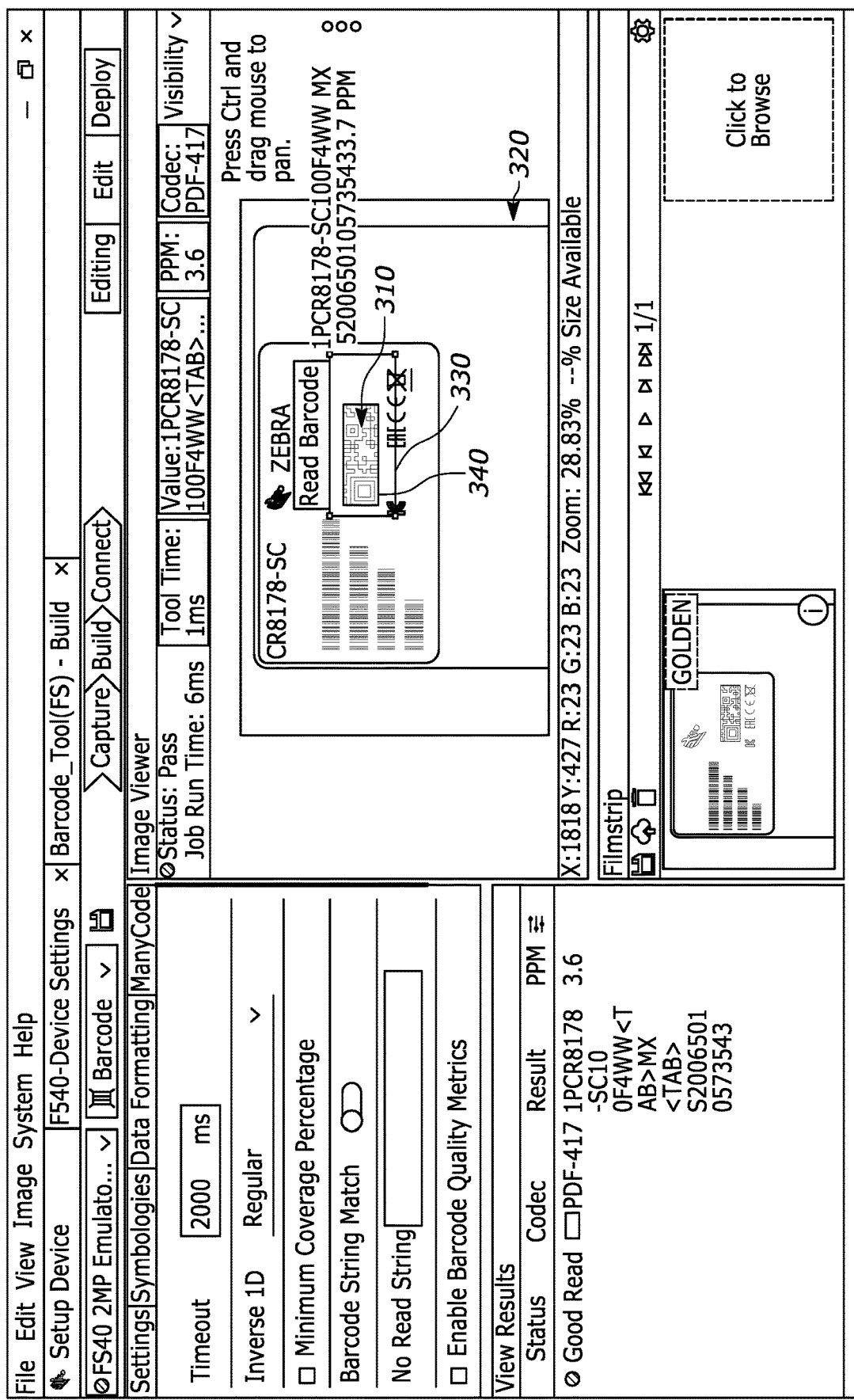
FIG. 4 depicts an example interface including identification of a single barcode, and an ROI set in accordance with embodiments described herein.

In FIG. 4, the example application interface 400 likewise depicts identification of a single barcode 310. However, in contrast to the example of FIG. 3, the ROI 330 has been set to a smaller portion of the image (e.g., not the entire FOV 320), thus saving time and processing power in searching the image.

Figure 5:
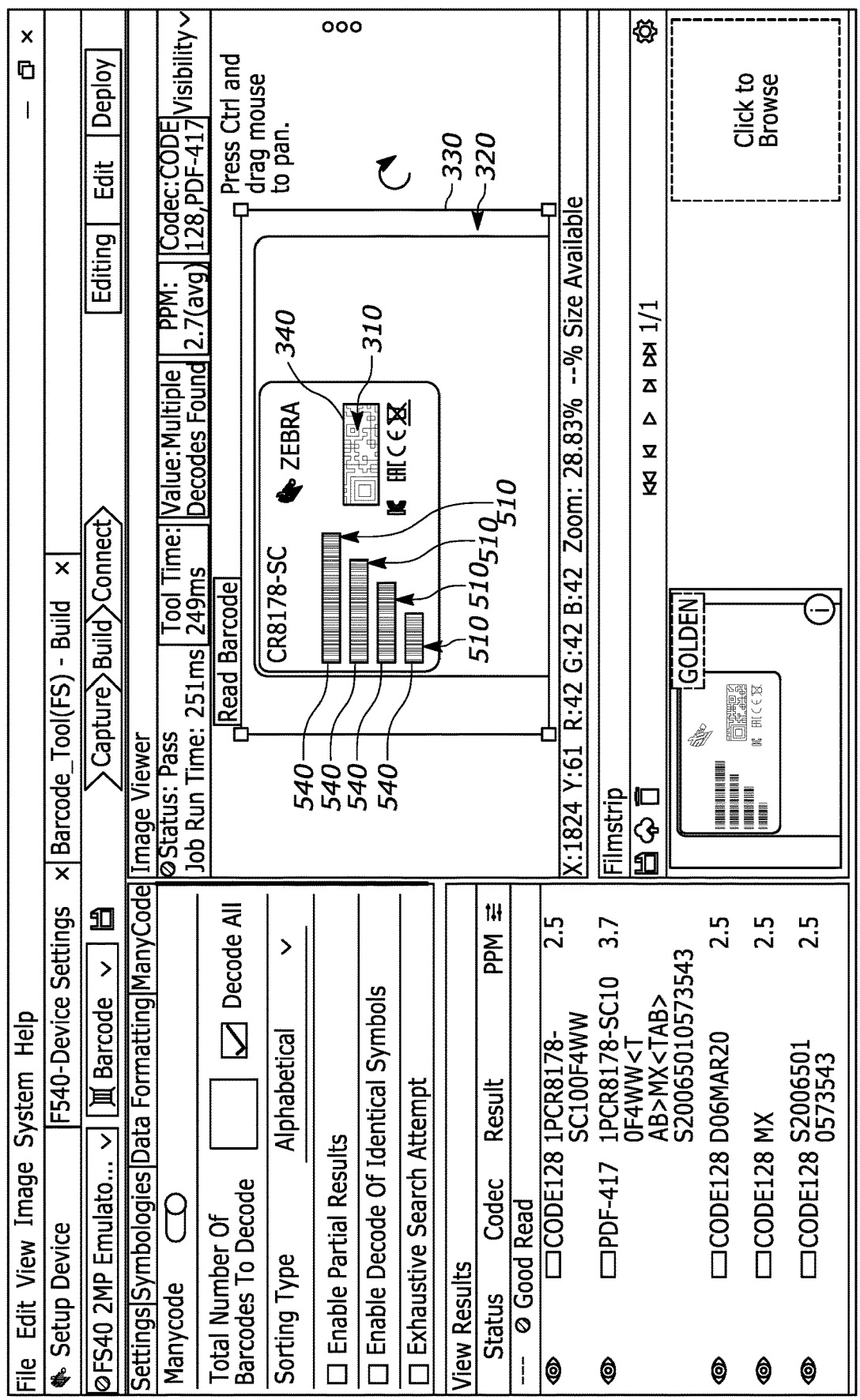
FIG. 5 depicts an example interface including identification of multiple barcodes, and where the ROI is the FOV.

In FIG. 5, the example application interface 500 depicts identification of barcode 310, as well as identification of additional barcodes 510. In the example of FIG. 5, the ROI 330 has been set to the FOV 320 (e.g., the entire image); and bounding boxes 540 have been drawn around the barcodes 510.

Figure 6:
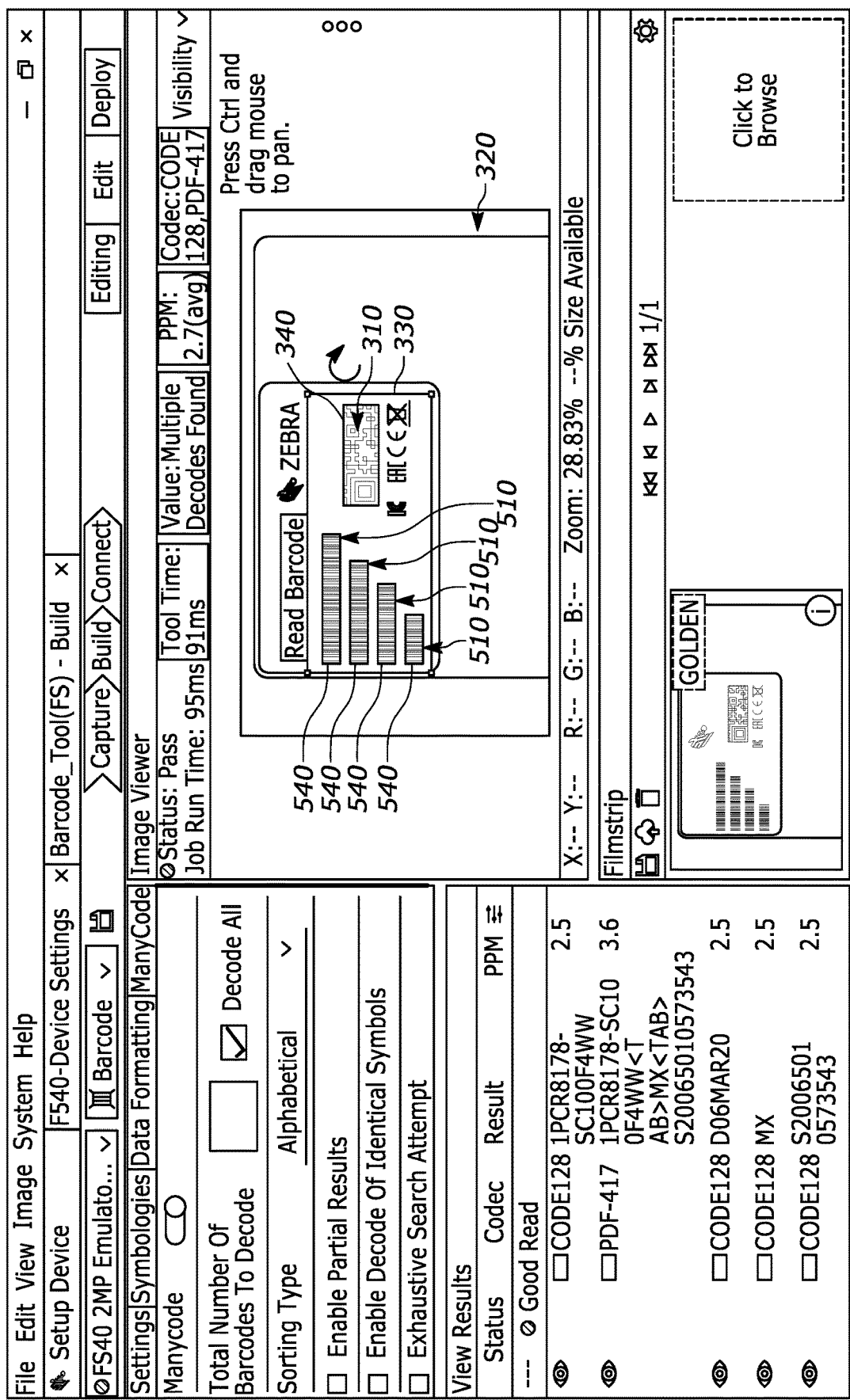
FIG. 6 depicts an example interface including identification of multiple barcodes, and an ROI set in accordance with embodiments described herein.

In FIG. 6, the example application interface 600 also depicts identification of barcode 310, as well as identification of additional barcodes 510. However, in contrast to the example of FIG. 5, the ROI 330 has been set to a smaller portion of the image (e.g., not the entire FOV 320), thus saving time and processing power in searching the image. The example of FIG. 6 also illustrates bounding boxes 540 drawn around the barcodes 510.

Figure 7:
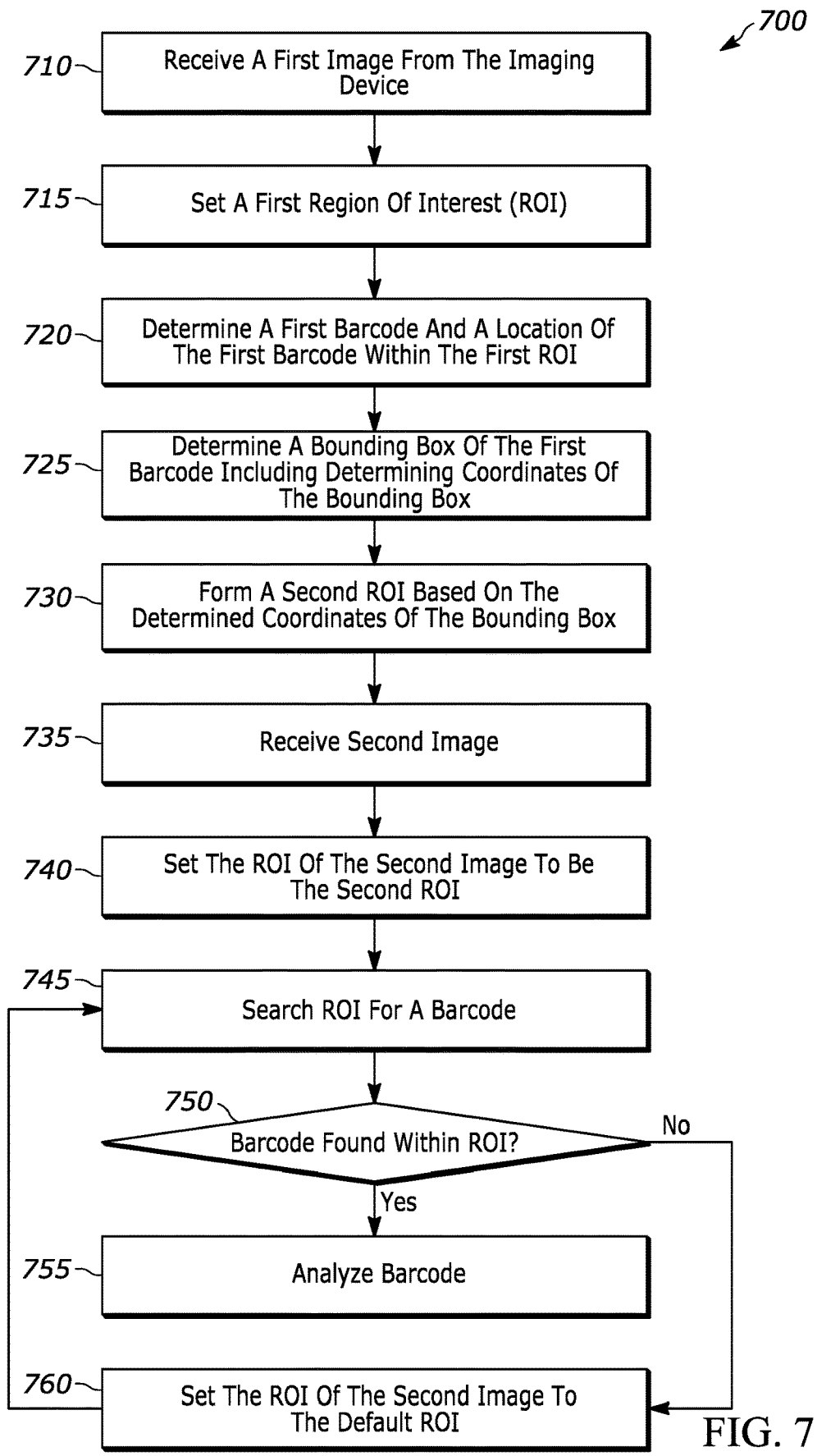
FIG. 7 illustrates an example method of creating an ROI with respect to a single barcode, including setting an ROI of a second image from an ROI determined from a first image.

FIG. 7 illustrates an example method 700 of creating an ROI with respect to a single barcode, including determining ROIs in both a first image and a second image. The images may be sequential images, or there may be intervening images between the first image and the second image. For example, the first and second images may be in a video stream, and separated by a predefined time period. It should be understood that a user (e.g., via the user computing device 102) may select whether the system should identify a single barcode or multiple barcodes.

At block 710, the imaging application 116 receives a first image from the imaging device 104. The image may be a single image, or part of a video stream sent to the imaging application 116.

At block 715, the imaging application 116 sets a first ROI. In some embodiments, the first ROI is set to a default ROI, such as the FOV of the image (e.g., the entire image). This may be set by default by the imaging application 112. In other embodiments, the first ROI is only part of the FOV. For instance, a user (e.g., via the user computing device 102) may manually set a first ROI by drawing a particular shape, or by specifying a set of parameters, such as a shape of the ROI (e.g., a rectangle, a triangle, a pentagon, or a polygon with n-sides, etc.) or size of the ROI (e.g., ROI is 50% of the FOV). In still other embodiments, the first ROI may be automatically generated from past data (e.g., a machine learning algorithm trained by past images).

At block 720, the imaging application 116 determines a presence of a first barcode (e.g., the barcode 310 of the example of FIG. 3), and a location of the first barcode within the image. The determination of the presence of the barcode may be done by any suitable technique to identify the barcode within the ROI. In some embodiments, the presence of the barcode is determined by the imaging application 116 being able to decode the barcode. However, it should be noted that the barcode does not necessarily have to be decoded for its presence to be detected. In addition, as used herein, the phrases "determine the presence of" and "detect the presence of" may be used synonymously. Furthermore, it should be understood that "barcode" as referred to herein also refers to effective equivalents of a barcode, such as a quick response (QR) code or other information marker.

At block 725, the imaging application 116 determines a bounding box of the first barcode (e.g., bounding box 340 of the example of FIG. 3). In some embodiments the bounding box encompasses exactly the barcode. In other embodiments, the bounding box encompasses the barcode as well as a small area outside of the barcode. For example, the bounding box may encompass the barcode, as well as an area extending 10% by length beyond of each of the sides of the barcode.

The bounding box may be defined by any suitable coordinate system, such as the coordinate system discussed above with respect to the FOV (e.g., a Cartesian coordinate system, polar coordinate system, cylindrical coordinate system, spherical coordinate system, etc.). In this regard, block 725 further includes determining coordinates of the bounding box.

At block 730, the imaging application 116 forms a second ROI based on the determined location of the first barcode. For example, the imaging application 116 may determine the second ROI based on the coordinates of the bounding box. For instance, in a Cartesian coordinate system, the second ROI may be formed by setting: (i) a lowest x-coordinate of the second ROI based on the lowest x-coordinate of the bounding box, (ii) a highest x-coordinate of the second ROI based on the highest x-coordinate of the bounding box, (iii) a lowest y-coordinate of the second ROI based on the lowest y-coordinate of the bounding box, and (iv) a highest y-coordinate of the second ROI based on the highest y-coordinate of the bounding box. In one example of this, each of the lowest/highest x and y coordinates of the second ROI may be set based on predetermined percentages of the lengths of the bounding box. For example, the second ROI may be formed by setting a lowest x coordinate of the second ROI to be apart from the lowest x-coordinate of the bounding box by 10% of a horizontal length of the bounding box. For example, if the horizontal length of the bounding box is 40, the lowest x-coordinate of the second ROI may be four lower than the lowest x-coordinate of the bounding box (e.g., the lowest x-coordinate of the bounding box is ten so the lowest x-coordinate of the second ROI is set to six). In this example, the highest x-coordinate, as well as the lowest/highest y-coordinates may be set in an analogous fashion to the lowest x-coordinate.

However, in some embodiments, the second ROI is not rectangular, and rather may be any shape. For instance, the second ROI may be a circle, triangle, pentagon, or any n-sided polygon or object. For example, a user of the computing device 102 may specify the shape that the imaging application 116 makes the second ROI to be.

At block 735, the imaging application 116 receives a second image (e.g., from the imaging device 104). The image may be a single image, or part of a video stream sent to the imaging application 116. In this regard, the second image may be part of the same video stream as the first image. For example, the imaging device 104 may send a video stream to the imaging application 116 and the second image may be taken from the video stream at a predetermined time interval (e.g., 10 seconds, 1 minute, etc.) after the first image.

At block 740, the imaging application 116 sets the ROI of the second image to be the second ROI that was formed at block 730. In some examples, it is likely that there will be a barcode in this ROI. For example, if a batch of worker IDs are being scanned by placing each ID in a particular location so that it can be captured by the imaging device 104, it may be likely that the barcode is in a similar location in each image.

At block 745, the imaging application 116 searches the ROI for a barcode, and determines if the barcode is found at block 750. If so, the imaging application 116 analyzes the barcode (e.g., by decoding the barcode) at block 755. From here, the imaging application 116 may continue by transmitting the decoded data upstream, and continuing to run the job, etc. If the answer at block 750 is negative, the imaging application sets the ROI to be a default ROI. In some embodiments, the default ROI is the FOV of the second image (e.g., sets the ROI to be the entire image, as in the example of FIG. 3) at block 760. Alternatively, rather than set the ROI to be the default ROI, the imaging application 116 may expand the ROI. For example, if the ROI is rectangular, the imaging application 116 may increase each of the sides by a predetermined percentage (e.g., 10%).

Following block 760, the example method iterates back to block 745 to search the enlarged ROI for a barcode (e.g., in the same image or a subsequent image).

Figure 8:
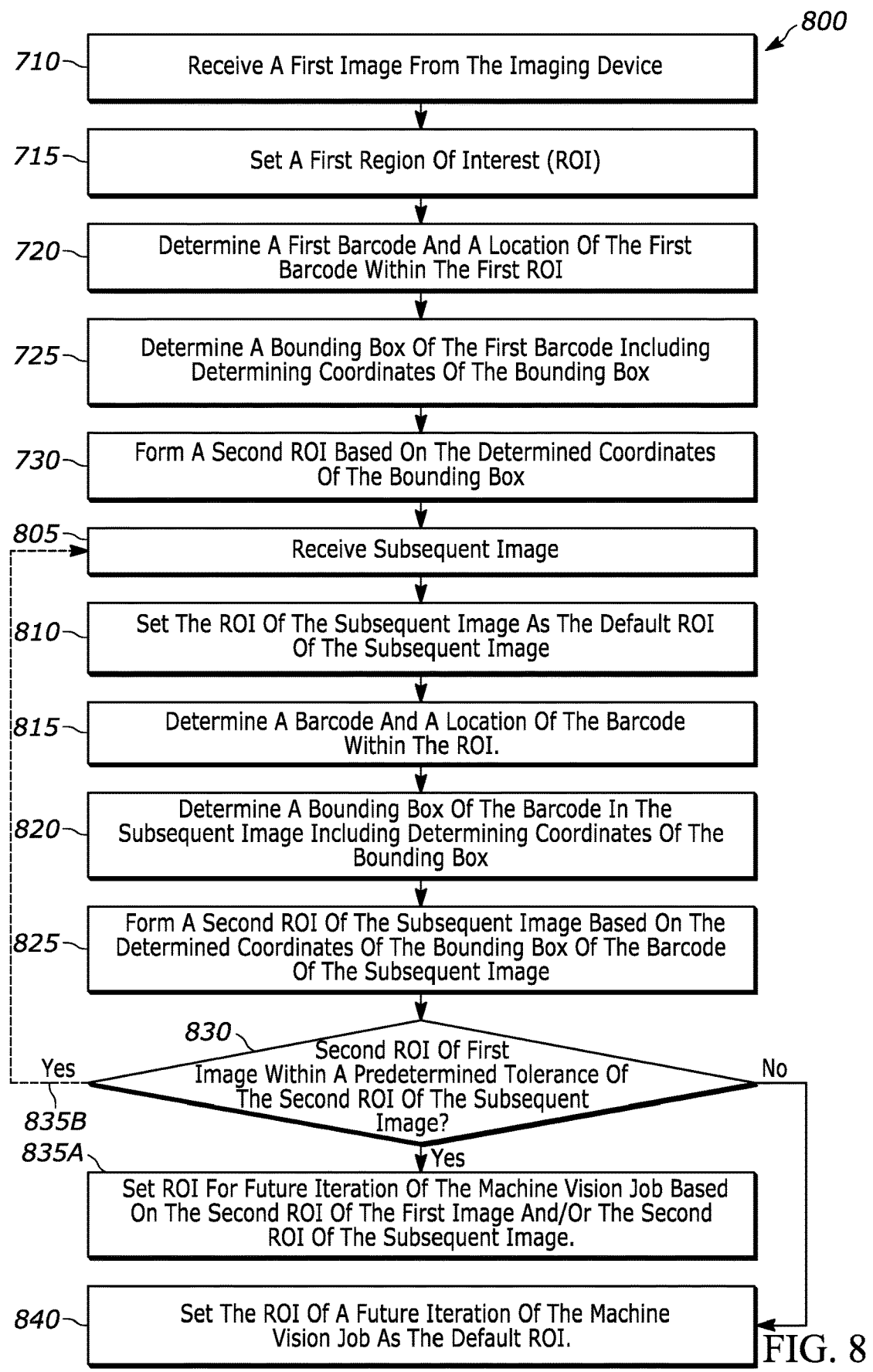
FIG. 8 illustrates an example method of creating an ROI with respect to a single barcode, including comparing ROIs to determine if they are within a predetermined tolerance.

FIG. 8 illustrates an example method 800 of creating an ROI with respect to a single barcode, including comparing ROIs to determine if they are within a predetermined tolerance (e.g., by comparing coordinates of the sides of the ROIs), as will be described further below. With reference thereto, blocks 710-730 are performed similarly as in FIG. 7.

At block 805, the imaging application 116 receives a subsequent image. At block 810, the imaging application 116 sets the ROI of the subsequent image as the default ROI. In some embodiments, the default ROI is the FOV of the subsequent image (e.g., the entire image).

At block 815, the imaging application 116 determines the presence of a barcode, and a location of the barcode within the ROI. The determination may be done by any suitable technique to identify the barcode and location thereof within the ROI. At block 820, the imaging application 116 determines a bounding box of the barcode within the ROI of the subsequent image. As with the bounding box determined at block 725, the bounding box may be determined by any suitable technique, and according to any suitable coordinate system. If no barcode is found in the ROI, the method simply expands the ROI (e.g., by setting the ROI to the FOV, or otherwise expanding the ROI, as in block 760 of the example of FIG. 7).

At block 825, the imaging application 116 forms a second ROI of the subsequent image based on the determined coordinates of the bounding box of the barcode of the subsequent image. The second ROI of the subsequent image may be formed similarly to the second ROI of the first image at block 730.

At decision block 830, the imaging application 116 determines if the second ROI of first image is within a predetermined tolerance (e.g., measured by pixel distance as pixel values and/or pixel coordinates; or measured by a percentage of a length of a side, etc.) of the second ROI of the subsequent image. The difference between ROIs (to be compared to the predetermined tolerance) may be determined by any suitable method. For example, the pixel values and/or coordinates of the ROIs may be compared to determine the difference between pixel values or coordinates (e.g., the lower x-coordinates may be compared, upper x-coordinates may be compared, lower y-coordinates may be compared, and/or upper y-coordinates may be compared, etc.). Additionally or alternatively, side lengths of the ROIs may be compared to determine the difference as a percentage difference between lengths.

If the answer to block 830 is affirmative, the imaging application sets the ROI for one or more future iterations of the machine vision job based on the second ROI of the first image and/or the second ROI of the subsequent image at block 835A. For example, the second ROI for future iterations of the machine vision job may be set to an average of the second ROI of the first image and the second ROI of the subsequent image. The average may be computed by any suitable method. For example, the average may be computed by averaging: (i) a lowest x-coordinate of the second ROI of the first image with a lowest x-coordinate of the second ROI of the subsequent image, (ii) a highest x-coordinate of the second ROI of the first image with a highest x-coordinate of the second ROI of the subsequent image, (iii) a lowest y-coordinate of the second ROI of the first image with a lowest y-coordinate of the second ROI of the subsequent image, (iv) a highest y-coordinate of the second ROI of the first image with a highest y-coordinate of the second ROI of the subsequent image. Alternatively, the second ROI for future iterations of the machine vision job may be set directly to either of the second ROI of the first image or the second ROI of the subsequent image.

However, in some variations, the method uses more than two images to determine future ROIs. Thus, in some variations, rather than proceed to block 835A, the method iterates back, via 835B, to block 805, and another subsequent image is received. In this way, the method may iteratively collect, up to a predetermined number (e.g., 5 ROIs, 10 ROIs, etc.) of second ROIs, second ROIs to be used to determine future ROIs. Further in this way, the imaging application 116 may keep an average ROI that is continually updated with each subsequent image. In some embodiments, if a second ROI is not within a predetermined tolerance of the first ROI or of an average of already-collected ROIs, it is discarded and not added to the average.

Returning now to decision block 830, if it is determined that the second ROI of the first image is not within the predetermined tolerance of the second ROI of the subsequent image, the imaging application 116 sets the ROI of a future iteration of the machine vision job as the default ROI of the image of the future iteration of the machine vision job at block 840. In some embodiments, the default ROI is the FOV of the image. To explain, if there is not a good match between the second ROIs of the first and subsequent images, this is a good indication that more data will be needed before determining how to set the ROIs for future images; and this data may be collected by setting the ROIs for future images to the FOV.

Figure 9:
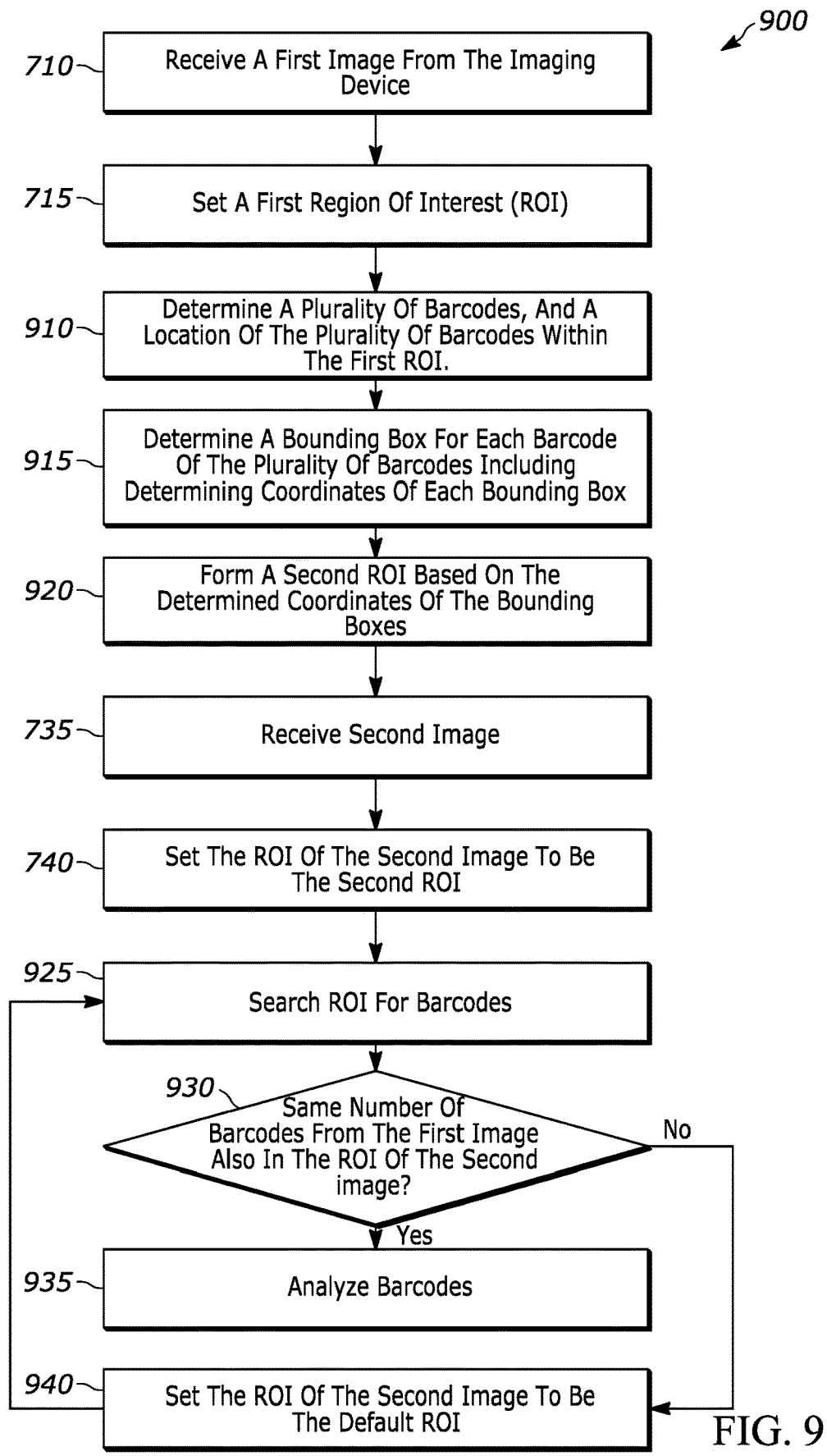
FIG. 9 illustrates an example method of creating an ROI with respect to multiple barcodes.

FIG. 9 illustrates an example method 900 of creating an ROI with respect to multiple barcodes rather than a single barcode. In the example of FIG. 9, blocks 710 and 715 are performed similarly as in FIG. 7.

At block 910, the imaging application 116 determines the presence of a plurality of barcodes (e.g., barcodes 310, 510 in the examples of FIGS. 5 and 6) and location thereof in the ROI of the first image. At block 915, the imaging application 116 determines a bounding box for each barcode of the plurality of barcodes (e.g., bounding boxes 340, 540 in the examples of FIGS. 5 and 6) including determining coordinates of the bounding boxes.

At block 920, the imaging application 116 forms a second ROI based on the determined coordinates of the bounding boxes. This may be done in any suitable way. For instance, in a Cartesian coordinate system, the second ROI may be formed by setting: (i) a lowest x-coordinate of the second ROI based on the lowest x-coordinate of the bounding boxes, (ii) a highest x-coordinate of the second ROI based on the highest x-coordinate of the bounding boxes, (iii) a lowest y-coordinate of the second ROI based on the lowest y-coordinate of the bounding boxes, and (iv) a highest y-coordinate of the second ROI based on the highest y-coordinate of the bounding boxes. In one example of this, each of the lowest/highest x and y coordinates of the new bounding boxes may be set based on predetermined percentages related to the lengths of the bounding boxes. For example, the imaging application 116 may first determine: (i) a horizontal length from the lowest x-coordinate of the bounding boxes of the plurality of barcodes to the highest x-coordinate of the bounding boxes of the plurality of barcodes, and (ii) a vertical length from the lowest y-coordinate of the bounding boxes of the plurality of barcodes to the highest y-coordinate of the bounding boxes of the plurality of barcodes. And, second, the imaging application 116 may set the x and y coordinates of the second ROI based on predetermined percentages of these determined vertical and horizontal lengths.

However, in some embodiments, the second ROI is not rectangular, and may be any shape. For instance, the second ROI may be a circle, triangle, pentagon, or any n-sided polygon or object. For example, a user of the computing device 102 may specify the shape that the imaging application 116 makes the second ROI to be.

At block 735, similarly as in the example of FIG. 7, a second image is received by the imaging application 116. At block 740, also similarly as in the example of FIG. 7, the imaging application 116 sets the second ROI of the first image to be the ROI of the second image.

At block 925, the imaging application 116 searches the ROI for barcodes. In this regard, the imaging application 116 may determine a number, type and/or other information of any barcodes found.

At decision block 930, the imaging application 116 determines if the number of barcodes found in the second image matches the number of barcodes found in the first image. If so, the method proceeds to 935, and the imaging application 116 analyzes the barcodes. If not, the imaging application sets the ROI to be the default ROI at block 940. In some embodiments, the default ROI is the FOV of the image (e.g., the entire image). Alternatively, rather than set the ROI to be the FOV, the imaging application 116 may expand the ROI. For example, if the ROI is rectangular, the imaging application 116 may increase each of the sides by a predetermined percentage (e.g., 10%).

In some variations, decision block 930 does not require an exact match between the number of barcodes in the first and second images; and this setting may be controlled manually by a user of the computing device 102. For instance, there may be five barcodes in the first image, but the barcodes will still be analyzed (e.g., at block 935) if there are at least four barcodes found in the ROI of the second image. In some embodiments, any discovered barcodes are analyzed in addition to changing the ROI at block 940.

Following block 940, the example method iterates back to block 925 to search the enlarged ROI for barcodes.

Figure 10:
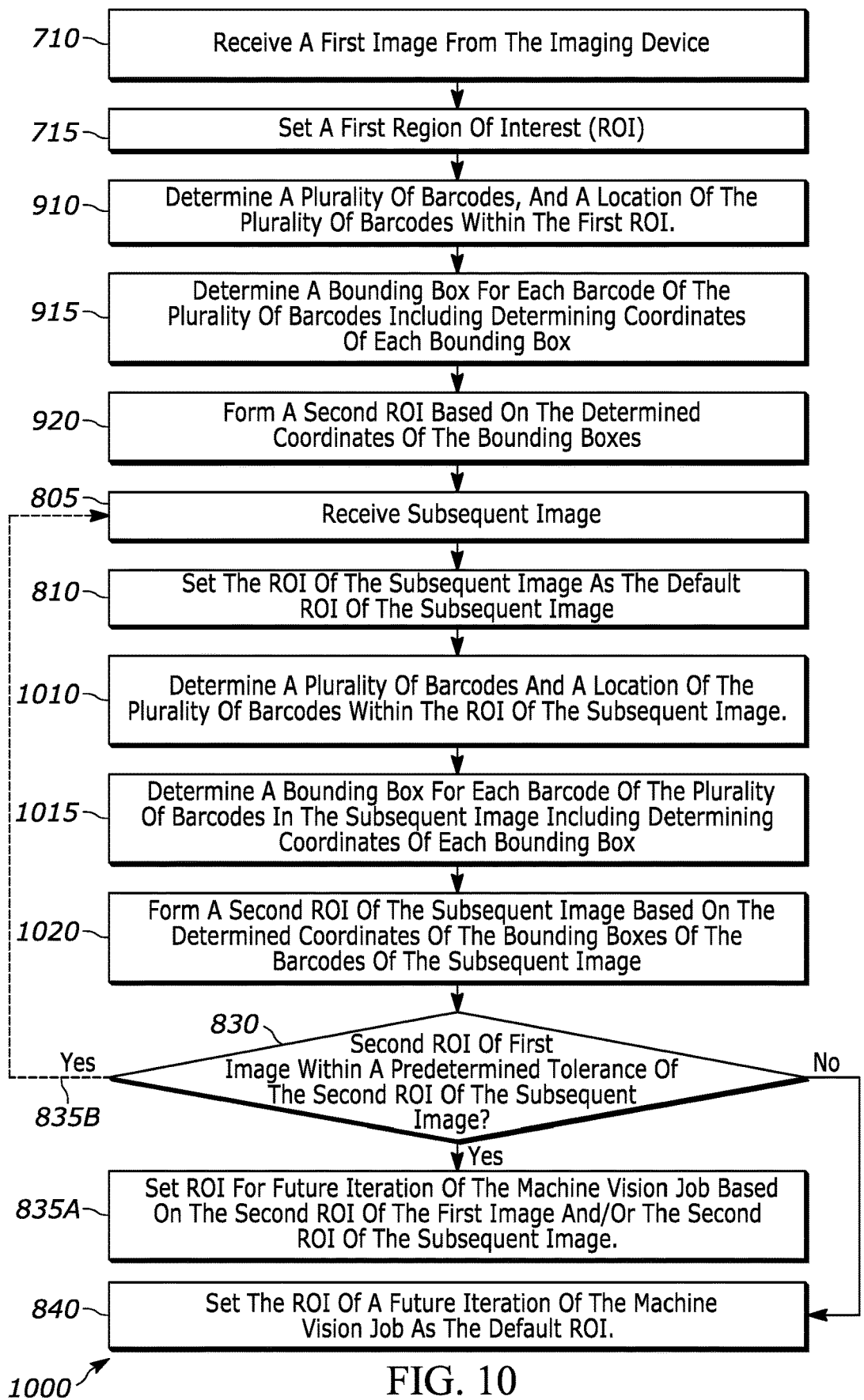
FIG. 10 illustrates an example method of creating an ROI with respect to multiple barcodes, including comparing ROIs to determine if they are within a predetermined tolerance.

FIG. 10 illustrates an example method 1000 of creating an ROI with respect to multiple barcodes, including comparing ROIs to determine if they are within a predetermined tolerance. It should be understood that in some implementations, the example method 1000 may simply be a combination of blocks of the examples of FIGS. 7-9; and, in this regard, like reference numerals refer to identical or functionally similar blocks.

In the example of FIG. 10, blocks 710 and 715 are performed similarly as in FIG. 7. At block 910, the imaging application 116 determines the presence of a plurality of barcodes similarly as in the example of FIG. 9.

At block 915, the imaging application 116 determines a bounding box for each barcode of the plurality of barcodes including determining coordinates of each bounding box. At block 920, the imaging application 116 forms a second ROI based on the determined coordinates of the bounding boxes as in the example of FIG. 9.

At block 805, the imaging application 116 receives a subsequent image. At block 810, the imaging application 116 sets the ROI of the subsequent image as the default ROI. In some embodiments, the default ROI is the FOV of the subsequent image. At block 1010, the imaging application 116 determines the presence of a plurality of barcodes and location thereof within the ROI of the subsequent image. At block 1015, the imaging application 116 determines a bounding box for each barcode of the plurality of barcodes in the subsequent image including determining coordinates of each bounding box. At block 1020, the imaging application 116 forms a second ROI of the subsequent image based on the determined coordinates of the bounding boxes of the barcodes of the subsequent image.

Blocks 830, 835A, 840 are performed similarly as in the example of FIG. 8. Also as in the example of FIG. 8, the example method 1000 may iterate (via 835B) back to block 805.

Additionally, it is to be understood that each of the actions described in the example methods 700, 800, 900, 1000 may be performed in any order, number of times, or any other suitable combination(s). For example, some or all of the blocks of the methods 700, 800, 900, 1000 may be fully performed once or multiple times. In some example implementations, some of the blocks may not be performed while still effecting operations herein. Moreover, the methods 700, 800, 900, 1000 are not mutually exclusive, and the blocks may be performed in connection and/or combination with each other in any suitable way.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for operating a machine vision system, the machine vision system including a computing device for executing an application and a fixed imaging device communicatively coupled to the computing device, the method comprising:
   (a) capturing, via the fixed imaging device, a first image over a field of view (FOV);
   (b) analyzing, via the application, at least a portion of the first image to detect a first barcode within the first image;
   (c) determining a location of the first barcode within the first image;
   (d) capturing, via the fixed imaging device, a second image;
   (e) analyzing, via the application, a region of interest (ROI) of the second image to detect a second barcode, the ROI of the second image being a portion of the second image that includes the location of the first barcode within the first image; and
   (f) responsive to detecting the second barcode, transmitting data associated with the second barcode upstream.

2. The method of claim 1, wherein the second image is captured over the FOV.

3. The method of claim 1, wherein the computing device and the fixed imaging device are housed within an enclosure fixedly attached to a structure.

4. The method of claim 1, wherein the analyzing the at least a portion of the first image to detect the first barcode within the first image includes analyzing a portion of the first image to detect the first barcode within the first image.

5. The method of claim 1, wherein, responsive to not detecting the second barcode within the ROI of the second image, the method further includes:
   (g) capturing, via the fixed imaging device, a third image;
   (h) analyzing, via the application, an ROI of the third image to detect a third barcode; and
   (i) responsive to detecting the third barcode, transmitting data associated with the third barcode upstream,
   wherein the ROI of the third image occupies at least a portion of the third image and is larger than the ROI of the second image.

6. The method of claim 1, wherein steps (a)-(c) are performed during a first iteration of a machine vision job, and wherein steps (d)-(f) are performed during a second iteration of a machine vision job.

7. The method of claim 1, further comprising determining, via the application, a bounding box of the first barcode;
   wherein the ROI of the second image is formed based on the bounding box of the first barcode.

8. The method of claim 1, further comprising:
   determining, via the application, a bounding box of the first barcode including determining (i) a lowest x-coordinate of the bounding box, (ii) a highest x-coordinate of the bounding box, (iii) a lowest y-coordinate of the bounding box, and (iv) a highest y-coordinate of the bounding box;

wherein the ROI of the second image is formed by setting:
(i) a lowest x-coordinate of the ROI of the second image based on the lowest x-coordinate of the bounding box, (ii) a highest x-coordinate of the ROI of the second image based on the highest x-coordinate of the bounding box, (iii) a lowest y-coordinate of the ROI of the second image based on the lowest y-coordinate of the bounding box, and (iv) a highest y-coordinate of the ROI of the second image based on the highest y-coordinate of the bounding box.

9. The method of claim 8, further comprising:

determining, via the application: (i) a horizontal length of the bounding box, and (ii) a vertical length of the bounding box; and wherein:
the lowest x-coordinate of the ROI of the second image is determined further based on a first predetermined percentage of the horizontal length;

the highest x-coordinate of the ROI of the second image is determined further based on a second predetermined percentage of the horizontal length;

the lowest y-coordinate of the ROI of the second image is determined further based on a first predetermined percentage of the vertical length; and the highest y-coordinate of the ROI of the second image is determined further based on a second predetermined percentage of the vertical length.

\* \* \* \* \*